United States Patent
Taine et al.

(10) Patent No.: US 9,838,375 B2
(45) Date of Patent: Dec. 5, 2017

(54) RESTLIKE API THAT SUPPORTS A RESILIENT AND SCALABLE DISTRIBUTED APPLICATION

(71) Applicant: Microsoft Corporation, Redmond, WA (US)

(72) Inventors: Stephane Taine, Issaquah, WA (US); Shiladitya Bandyopadhyay, Bothell, WA (US); Ganesh Sridharan, Redmond, WA (US); Shahzaib Younis, Redmond, WA (US); Krishnamurthy Ganesan, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 730 days.

(21) Appl. No.: 13/925,827

(22) Filed: Jun. 25, 2013

(65) Prior Publication Data
US 2014/0244818 A1      Aug. 28, 2014

Related U.S. Application Data

(60) Provisional application No. 61/771,073, filed on Feb. 28, 2013.

(51) Int. Cl.
*H04L 29/06* (2006.01)
*H04L 29/08* (2006.01)
(Continued)

(52) U.S. Cl.
CPC ........ *H04L 63/0807* (2013.01); *G06F 21/335* (2013.01); *G06F 21/57* (2013.01);
(Continued)

(58) Field of Classification Search
CPC .......................... H04L 63/0807; G06F 21/335
(Continued)

(56) References Cited

U.S. PATENT DOCUMENTS

| 6,405,216 B1 | 6/2002 | Minnaert et al. |
| 2004/0061719 A1 | 4/2004 | Barsness et al. |

(Continued)

FOREIGN PATENT DOCUMENTS

WO      2010/042733 A1      4/2010

OTHER PUBLICATIONS

Oracle, Section 7: Managing Sessions, Oracle Fusion Middleware Administrator's Guide for Oracle Access Manager with Oracle Security Token Service 11g Release 1 (11.1.1), released Aug. 14, 2010 (12 pages).*

(Continued)

*Primary Examiner* — Wing F Chan
*Assistant Examiner* — Leon Y Tseng
(74) *Attorney, Agent, or Firm* — Medley, Behrens & Lewis, LLC

(57) ABSTRACT

An application distributed amongst plurality of computing devices leverages an application programming interface that conforms to a representational state transfer architecture in order to provide resilient services to clients and adapt to a change in availability of devices. A proxy server routes communications between clients and servers, detects when a server becomes unavailable, and reroutes communications to a replacement server. A registration database on the proxy server records entries for clients, such that communications can be routed to active devices of a user.

20 Claims, 9 Drawing Sheets

(51) Int. Cl.
*G06F 21/33* (2013.01)
*G06F 21/57* (2013.01)
*G06F 21/62* (2013.01)

(52) U.S. Cl.
CPC ............ *G06F 21/629* (2013.01); *H04L 65/40* (2013.01); *H04L 67/02* (2013.01); *H04L 67/10* (2013.01); *H04L 67/1095* (2013.01); *H04L 67/2814* (2013.01); *H04L 67/327* (2013.01)

(58) Field of Classification Search
USPC ........................................................ 709/223
See application file for complete search history.

(56) References Cited

U.S. PATENT DOCUMENTS

| | | | |
|---|---|---|---|
| 2007/0156842 | A1 | 7/2007 | Vermeulen et al. |
| 2010/0128598 | A1 | 5/2010 | Gandhewar et al. |
| 2010/0131639 | A1 | 5/2010 | Narayana et al. |
| 2010/0223334 | A1* | 9/2010 | Narayanan ............... H04L 12/18 709/205 |
| 2011/0299387 | A1* | 12/2011 | Eydelman ............. H04L 41/069 370/225 |
| 2012/0240129 | A1* | 9/2012 | Kanso .................... G06F 9/505 718/105 |
| 2013/0019000 | A1* | 1/2013 | Markus .................. G06F 9/466 709/223 |
| 2013/0191882 | A1* | 7/2013 | Jolfaei ................ H04L 63/0807 726/4 |
| 2013/0268751 | A1* | 10/2013 | Preiss ............... H04M 1/72563 713/155 |

OTHER PUBLICATIONS

Rosenberg et al., RFC 3261—SIP: Session Initiation Protocol, Jun. 2002 (269 pages).*

"International Preliminary Report on Patentability for PCT Patent Application No. PCT/US2014/018463", dated Apr. 16, 2015, 7 pages.

"International Search Report & Written Opinion for PCT Patent Application No. PCT/US2014/018463", dated Jul. 9, 2014, Filed Date: Feb. 26, 2014, 11 Pages.

"Public Mashery/iodocs", Retrieved at <<https://github.com/mashery/iodocs>>, Retrieved Date: Mar. 13, 2013, pp. 1-11.

"Document your API with Style", Retrieved at <<https://developers.helloreverb.com/swagger/>>, Retrieved Date: Mar. 13, 2013, pp. 1-4.

Stokes, Luke, "Hypermedia Dog Food", Retrieved at <<http://www.foxycart.com/blog/hypermedia-dog-food#.UUFNoNZmiSp>>, Jan. 24, 2013, pp. 1-4.

Duvall, Paul, "Automation for the People: Pushbutton Documentation", Retrieved at <<http://www.ibm.com/developerworks/library/j-ap06108/index.html>>, Jun. 10, 2008, pp. 1-10.

Verborgh, et al., "Functional Descriptions as the Bridge Between Hypermedia APIs and the Semantic Web", In Proceedings of the Third International Workshop on RESTful Design, Apr. 17, 2012, pp. 1-8.

Gruenbaum, Peter, "Automated Documentation for REST APIs", Retrieved at <<http://blog.programmableweb.com/2012/03/28/automated-documentation-for-rest-apis/>>, Mar. 28, 2012, pp. 1-8.

"Visualize Code Dependencies on Dependency Graphs", Retrieved at <<http://msdn.microsoft.com/en-us/library/dd409453.aspx#Graphitems>>, Retrieved Date: Mar. 18, 2013, pp. 1-26.

"Graphviz—Graph Visualization Software", Retrieved at <<http://graphviz.org/>>, Retrieved Date: Mar. 18, 2013, pp. 1-3.

"Data-Driven Documents", Retrieved at <<http://d3js.org/>>, Retrieved Date: Mar. 18, 2013, pp. 1-3.

"Arborjs", Retrieved at <<http://arborjs.org/>>, Retrieved Date: Mar. 18, 2013, p. 1.

"Thinkmap", Retrieved at <<http://www.thinkmap.com/pressrelease.jsp?id=1306>>, Retrieved Date: Mar. 18, 2013, pp. 1-3.

Johncla, "Lync Developer Roundtable: UCWA Overview", Retrieved at <<https://channel9.msdn.com/posts/Lync-Developer-Roundtable-UCWA-Overview>>, Aug. 14, 2012, p. 1.

* cited by examiner

RESTLIKE API THAT SUPPORTS A RESILIENT AND SCALABLE DISTRIBUTED APPLICATION

RELATED APPLICATION

This application claims priority to U.S. Provisional Patent Application No. 61/771,073, filed Feb. 28, 2013, and entitled "UNIFIED COMMUNICATIONS TECHNOLOGIES," the entirety of which is incorporated herein by reference.

BACKGROUND

A distributed application is software that executes on two or more computers in a network, wherein such computers can communicate with one another by way of the network. Generally, in a client-server environment, a distributed application has two portions: 1) a "front end" that executes on a client computing device(s); and 2) a "back end" that executes on other computing devices, such as a server computing device(s). An instance of the distributed application executing on a client computing device is referred to herein as a "client," while an instance of the distributed application executing on a server computing device is referred to herein as a "server." The distributed application can use an application programming interface (API) to provide a common interface for communications between different executing instances, and can be used to provide services, features, and information in a way that can be understood by application developers and used by different executing instances of the application.

Executing a client for a distributed application on a mobile device can present several challenges. Different mobile devices attempting to communicate with one another may use different communications protocols, and a mobile device may switch between protocols (e.g., from using a cellular communications network to using a Wi-Fi connection) when communicating with another device. Additionally, a mobile device may execute a client as a background operation, thus limiting the ability of the client to receive real-time communications. Other challenges associated with executing a client of a distributed application include cross-domain scripting, overly chatty communications, differences in devices or browsers that execute the client, etc. Such challenges can affect the resiliency of a distributed application, and limit the degree to which the distributed application can be scaled.

Further, memory and processing resources at a server are reserved to ensure that clients of the distributed application are functioning properly. When, for example, the distributed application is a real-time communications application, a server may desirably communicate with several clients at once (e.g., transmit an incoming message to a telephone, tablet, desktop, etc.), which can increase the memory and processing usage of the server. Furthermore, an interruption of a server (e.g., a server computing device undergoing scheduled maintenance) may negatively impact clients being served by such server (e.g., can cause clients to experience loss of functionality).

SUMMARY

The following is a brief summary of subject matter that is described in greater detail herein. This summary is not intended to be limiting as to the scope of the claims.

Various technologies pertaining to an application programming interface (API) that generally complies with a representational state transfer (REST) architecture are described herein. The API provides support for back-end software of a distributed application, facilitating adaption of the distributed application when availability of server computing devices alters. Accordingly, the API supports scaling of the application as well as increased resilience of the application when a communication interruption occurs, when a device fails, and/or when a server is undergoing scheduled maintenance.

An application distributed between one or more client computing devices and server computing devices (a distributed application) can use the aforementioned API in connection with providing resilient and scalable services to the client computing devices. In an exemplary embodiment, such application can be a unified communications (UC) application, an e-commerce application, a social-networking application, or other suitable application. A system architecture that supports the distributed application includes client computing devices in communication with server computing devices via a proxy server computing device, where the client computing devices execute client-side instances of the application (clients), the server computing devices execute server-side code (servers), and the proxy server computing device executes back-end software (a proxy server) that routes communications between the clients and servers.

The client computing devices may include desktop computing devices and/or portable computing devices, such as mobile telephones, tablets (slates), phablets, wearables, etc. In accordance with aspects described herein, real-time synchronous and asynchronous communications between clients and/or between a client and a server can be accomplished through employment of the API that complies with the REST architecture (e.g., a RESTlike API).

In an exemplary embodiment, each client can be served by a respective server, such that there is a one-to-one mapping between clients and servers. An application instance identifier (AID) can be used to identify a particular client. A state of a first server that is serving the client can be reproduced by a second server, such that service to the client need not be interrupted if the first server becomes unavailable. Additionally, it can be ascertained that a server computing device has limited memory and processing resources, and thus may be able to execute a limited number of servers. Therefore, it may be desirable to cause additional server computing devices to become available. To that end, activity of the server computing devices can be monitored, and servers can be distributed or re-distributed amongst the server computing devices as server computing devices are added or become unavailable.

The proxy server stores a respective AID for each client in a registration database, and further records respective servers that are serving the clients in the registration database. A communication received by the proxy server comprises an AID that can be compared with contents of the registration database, such that the proxy server can determine at least one intended recipient of the communication. The proxy server can route the communication, for example, by acting as a "man-in-the-middle," receiving and retransmitting the communication to the appropriate recipient(s). Additionally, the proxy server can establish a communications channel by way of which a client can communicate directly with a server.

When the proxy server receives a communication from the client, the proxy server routes the communication to the server that is serving such client. A server computing device can execute a plurality of servers, and thus the proxy server can be configured to route the communication to the server computing device, which then provides the communication to the appropriate server that is serving the client. Similarly, the proxy server also routes communications from the server that is identified as serving the client to the client. In some instances, a user may be using multiple client computing devices. For example, a user that is an intended recipient of a video call may be using a mobile phone, a tablet, a desktop, etc., and may be able to use any of those devices to answer the video call. Thus, the proxy server can ascertain an identity of the user from the AID in the communication received from the server, and use the registration database to identify the client computing device(s) used by the user. The proxy server can then route the communication to each client computing device associated with the user. When the user answers the video call using a particular client computing device (e.g., the tablet), the client computing device can transmit an indication to the proxy server that it has been selected by the user. Thereafter, the proxy server can route communications from the server to the selected client computing device (the tablet).

Communications leveraging the API are modeled in terms of identifiers and commands, where the identifiers represent resources maintained by a server, and the commands represent methods of interacting with resources, such as conventional hypertext-transfer-protocol (HTTP) methods and hypermedia types. A resource can be or include data, such as a document, image, database entry, etc. In another example, a resource can be or include computer-executable code, such as a service, an executable thread, etc. Furthermore, resources generally pertain to a particular concept described by their respective identifiers. For example, a "contacts" resource can include a list of contacts of a user, or can be a service that retrieves the list of contacts from other resources. Each resource is identified by a respective identifier that can be used by the client to access a respective resource. For example, the identifier can be a global identifier (e.g., such as a universal resource locator URL). Resources can also comprise identifiers of other resources, so as to indicate a link-relation between resources. For example, a "features" resource can also comprise an identifier of the "contacts" resource, thus indicating that the contacts list is a feature of the application. The client, after accessing the "features" resource and locating the identifier for the "contacts" resource, can then use the identifier for the "contacts" resource to retrieve the list of the contacts. Such link-relations can allow a client to navigate through resources in a manner that is similar to how a user can navigate through web pages using hyperlinks.

While a resource available to a client is generally maintained by a particular server, a resource may not be specific to that server. For example, the "contacts" resource can be a non-specific resource that, regardless of what server is maintaining the resource, can fetch a list of contacts of the user and make the list available to the client. Therefore, if the particular server maintaining the resource becomes unavailable, a different server can take on the maintenance of the resource in order to prevent a gap in service for the client.

When the application provides media communications, such as the above-noted video call, it may be desirable to host the media on a media server separate from the server that generally serves the client. For example, a video conference application can provide a client with video media as well as presence information (indicating availability of other users), as well as other features like chat and/or document sharing. The server that serves the client can maintain resources that support the presence information, instant messaging functionality, or other services, and a separate media server can serve video for the video call. If the server becomes unavailable, video media being provided to the client is uninterrupted while the proxy server identifies a replacement server. Thus, the client can be provided an illusion of uninterrupted service.

When a client served by a server has not been used for an extended period of time, it may be desirable for the server computing device executing the server to re-assign memory and processing resources assigned to the server to other servers executed by the server computing device. Thus, after determining that the server has not received a communication for a threshold period of time, the server computing device can de-allocate memory and or processing resources from the server. The server computing device can also suspend or remove resources maintained by the server. When a communication directed towards the server is received, the server computing device can re-allocate the memory and/or processing resources to the server, and re-active or re-create resources maintained by the server.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
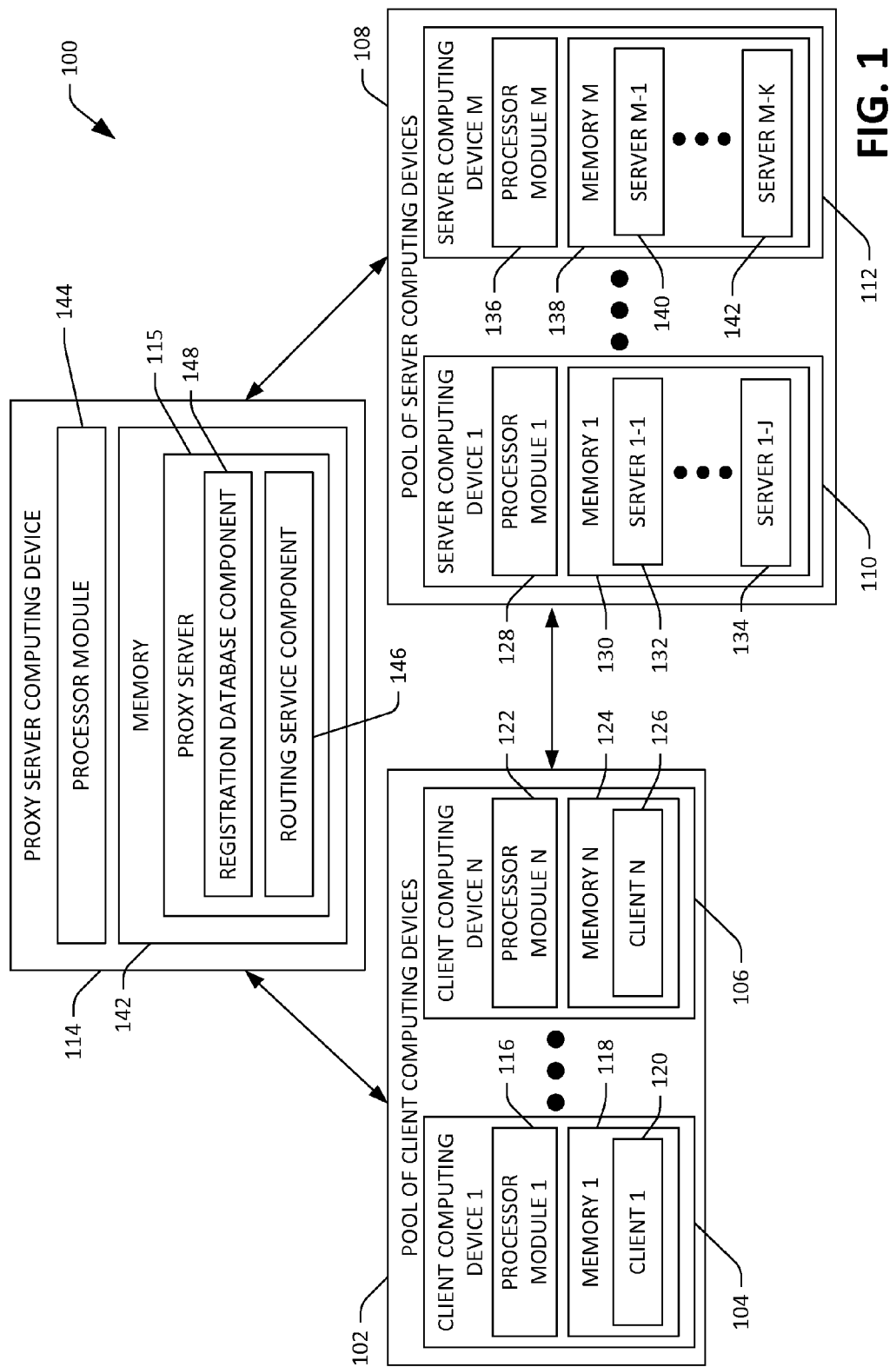
FIGS. 1 and 2 are functional block diagrams of respective exemplary systems that facilitate executing a distributed application that uses a RESTlike API.

Various technologies pertaining to resilient and scalable distributed applications that leverage an API that conforms to the representational state transfer (REST) architecture are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something, and is not intended to indicate a preference.

With reference now to FIG. 1, an exemplary system 100 that facilitates executing a distributed application that uses a RESTlike API is illustrated. The system 100 includes a pool of client computing devices 102 that comprises a plurality of computing devices 104-106. The client computing devices 104-106 can include desktop computing devices, laptop computing devices, netbooks, ultrabooks, tablets (slates), phablets, mobile telephones, wearables, etc. The system 100 further includes a pool of server computing devices 108 that comprises a plurality of server computing devices 110-112. Still further, the system 100 includes a proxy server computing device 114. The client computing devices 104-106, server computing devices 110-112, and the proxy server computing device 114 are in communication with one another by way of suitable respective network connections. Additionally, communications channels can be established directly between client computing devices in the pool of client computing devices 102 and/or between a client computing device in the pool of client computing devices 102 and a server computing device in the pool of server computing devices 108 to facilitate communications therebetween.

The pool of client computing devices 102, the pool of server computing devices 108, and the proxy computing device 114 are configured to support a resilient and scalable distributed application, wherein the client computing devices 104-106 execute respective client-side instances of the distributed application, the server computing devices 110-112 are each configured to execute at least one respective server-side instance of the distributed application, and the proxy server computing device executes back-end software of the distributed application that is referred to herein as a proxy server 115. As used herein, a client-side instance of the distributed application is referred to as a "client" and a server-side instance of the distributed application is referred to herein as a "server."

With more particularity, the first client computing device 104 includes a first processor module 116 that executes instructions retained in a first memory 118. The first memory 118 can include a first client 120. Similarly, the Nth client computing device 106 includes an Nth processor module 122 that is configured to execute instructions in an Nth memory 124, wherein the Nth memory 124 includes an Nth client 126.

The first server computing device 110 includes a first server processor module 128 that is configured to execute code in a first server-side memory 130. For example, the first server-side memory 130 can include a plurality of servers 132-134 (e.g., servers 1-1-1-J). Similarly, the Mth server computing device 112 includes an Mth server processor module 136 that is configured to execute code in an Mth server-side memory 138. The Mth server-side memory 138 can also comprise a plurality of servers 140-142 (e.g., servers M-1-M-K). Each of the servers 132-134 and 140-142 serves a respective client executed by one of the client computing devices 104-106, such that a one-to-one mapping exists between the clients 120 and 126 and the servers 132-134 and 140-142.

The proxy server computing device 114 includes proxy server processor module 144 that is configured to execute code in a memory 142 of the proxy server computing device 114. As will be described in greater detail herein, the proxy server 115 can be used in connection with causing the distributed application to act resiliently from the perspective of clients, such that a client is not negatively impacted when a server computing device goes offline.

As indicated above, the pool of client computing devices 102, the pool of server computing devices 108, and the proxy server computing device 114 can utilize a RESTlike API when communicating with one another, wherein the API is modeled in terms of identifiers and commands. The identifiers represent resources stored in a server memory (such as the first server memory 130), and the commands represent methods of interacting with resources, such as conventional hypertext-transfer-protocol (HTTP) methods and hypermedia types. Such identifiers and commands can be universal, in that they may be used without regard to a specific application being executed, a specific device being communicated with, or a specific operation being undertaken, and thus provide a generalized interface between devices. The first client 120 can employ the API when transmitting communications that comprise a request for a resource(s) (e.g., an identifier and a command) and when receiving a reply to the request that comprises data that facilitates the client 120 in transitioning to a new state, such as population of a graphical interface, performing an operation, etc.

Resources corresponding to the RESTlike API are now described. The format of a resource is arbitrary, as a resource can be structured as a database, a file, etc. A resource can be or include data, such as a document, an image, etc. Additionally, a resource can be or include computer-executable code that causes a server to communicate with other computing devices or other computer-executable code. Further, a resource can be or include a combination of data and computer-executable code. Additionally, each resource can be directed towards a respective concept described by its identifier. For example, a "contacts" resource can include a list of contacts of a user.

Additionally, each resource can be identified by a respective identifier that can be used by, for instance, the first client 120 to access a respective resource. Identifiers can be, for example, global identifiers, such as universal resource locators (URLs). A resource can also comprise an identifier of another resource (or multiple resources), so as to indicate a link-relation between the resource and the another resource. For example, a "features" resource can also comprise a link-relation to a "contacts" resource, wherein the "features" resource comprises an identifier of the "contacts" resource (e.g., the contacts resource comprising a list of contacts of the user). The first client 120, after accessing the "features"

resource (e.g., from a server that corresponds to the first client 120, such as the server 132) and locating the identifier for the "contacts" resource therein, can then use the identifier for the "contacts" resource to access the list of contacts. Such link-relations can allow the first client 120 to navigate through resources in a manner that is similar to how a user can navigate through webpages using hyperlinks.

Methods supported by the RESTlike API (represented by commands) for interacting with resources are now described in greater detail. Exemplary methods supported by the RESTlike API include conventional hypertext-transfer-protocol (HTTP) methods and hypermedia types. Thus, with more specificity, exemplary methods include a method for retrieving data from a resource (e.g., via a "GET" command), a method for adding data to a resource (e.g., via a "POST" command), a method for replacing or adding a resource (e.g., via a "PUT" command), and a method for deleting a resource (e.g., via a "DELETE" command). The first client 120 can generate a request that includes an identifier and a command, thereby identifying a resource desirably accessed and a method to be executed in connection with the resource. Additional detail pertaining to the RESTlike API is set forth below.

In an exemplary embodiment, the distributed application can be a communications application that supports bi-directional communications between the client computing devices 104-106. For instance, the communications application can be a unified communications (UC) application, which supports multiple communications modalities, including voice, presence, instant messaging, groups, desktop sharing, collaboration, and the like. In another example, the communications application can be or be included in a social networking application.

As indicated above, the distributed application may be a communications application, and the first client 120 can cause a graphical user interface (GUI) to be displayed on a display screen (not shown) of the first client computing device 104, wherein the GUI includes, for example, contacts of a user of the first client 120, messages received by the first client 120, etc. Additionally, the server 132 serving the first client 120 can access a listing of contacts of the user, messages sent and received via the first client 120, and other data, which is used to populate the GUI. The proxy server 115 is configured to route communications between the first client 120 the server 132 (as well as between other clients and servers that serve such clients). When the user of the first client computing device 104 seeks to transmit a communication to a contact (e.g., the user of the Nth client computing device 106), the first client 120 can communicate with the Nth client 126 via the proxy server 115 and the server 132.

With more particularity, when transmitting a communication to the Nth client, the first client 120 can transmit a communication identifying the user of the Nth client computing device 106 as an intended recipient to the proxy server 115. The proxy server 114 identifies that the server 132 is serving the first client 120, and routes the communication to the server 132 responsive to identifying that the server 132 is serving the first client 120. The server 132, responsive to receiving the communication, routes such communication to the Nth client 126 by way of the proxy server 115. The server 132 can generate other information to be routed to the first client 120 via the proxy server, such as an indication that the user of the Nth client computing device 106 is available.

Each client in the clients 120 and 126 is respectively identified by an application instance identifier (AID), which is a unique identifier that can be based upon an identity of a user of a client computing device executing the respective client and an identity of the client computing device itself. Thus, an AID can be used to identify a particular client computing device and/or a particular user of the client computing device. As described above, when the first client 120 desires to transition to a new state (e.g., perform an operation, retrieve data, etc.), the first client 120 generates a request that identifies a resource that can be used by the first client 120 to make the transition, and transmits a communication comprising the request to the proxy server 115. Communications transmitted by the first client 120 comprise its AID, such that a device receiving a communication transmitted from the first client computing device 104 can identify the first client computing device 104 and/or the user thereof. Further, the communication from the first client computing device 104 may comprises an authorization token supplied by the first client 120 that can be used by a recipient device to authenticate the client and/or user.

The proxy server 115 comprises a routing service component 146 that is configured to route communications between computing devices in the pool of server computing devices 108 and computing devices in the pool of client computing devices 102. For example, the routing service component 146 can be configured to establish a communications channel between devices in order to facilitate communications therethrough. Further, the routing service component can act as a man-in-the-middle, wherein the routing service component 146 is configured to receive a communication from a device, identify an intended recipient device or devices, and route the communication to the intended recipient device(s).

The proxy server 115 comprises a registration database component 148 that is configured to maintain a registration database comprising entries that include AIDs included in communications received by the proxy server 115. For example, the routing service component 146 can access the registration database maintained by the registration database component 148 to identify the server 132 that serves the first client 120. The registration database component 148 can update the registration database as the server that serves the first client 120 is moved in the pool of server computing devices 108 (e.g., for purposes of load distribution).

Therefore, the routing service component 146 is configured to identify a server computing device in the pool of server computing devices 108 that executes the server that supports the client identified in the AID via accessing the registration database. For example, the routing service component 146, responsive to receiving the communication transmitted by the first client 120, accesses the registration database and identifies the first server computing device 110 from amongst the pool of server computing devices 108 as including the server 132 (e.g., server 1-1) that serves the first client 120. Once the server 132 has been identified as serving the first client 120, the routing service component 146 routes the communication to the first server computing device 110. If the registration database does not indicate which server serves the first client 120, then the routing service component 148 can cause the server 132 to be instantiated on the first server computing device 110, and can thereafter cause the registration database component 148 to update the registration database.

In an example, the first server computing device 110 can already comprise the server 132, in which case the first server computing device 110 provides the communication to the server 132. The server 132 can then generate a response to the communication based at least in part upon the resource(s) identified in the communication. In an example, the response comprises the resource(s). In another example, the server 132 can generate a data packet based upon content of a first resource, and the response can include such data packet. For example, such data packet may be smaller in size when compared to the size of the first resource. Additionally, the data packet may be in a format that is more readily parsed by the first client 120 when compared to the format of the first resource. In an example, the data packet can be or include a document, a listing, or the like, and may be in a structured file format such as a markup file (e.g., XML) or an object notation file (e.g., JSON).

The first server computing device 110 transmits a second communication that comprises the response and the above-noted AID to the proxy server 115. The routing service component 146 receives the second communication, and identifies the first client computing device 104 by comparing the AID with contents of the registration database. The routing service component 146 then routes the second communication to the first client computing device 104, which provides the response to the first client 120. Using such response, the first client 120 can transition to the new state. Thus, rather than having to store content locally, the first client 120 can access the content by sending a request for a resource. Using identifiers and methods allows the first client 120 to interact with a resource without having to have any knowledge as to what server is maintaining the resource or how the content is retrieved.

In another exemplary embodiment, the first server computing device that receives the communication from the first client 120 by way of the proxy server 115 may fail to comprise the server 132. In such embodiment, the first server computing device 110, responsive to receiving the communication, instantiates the server 132 thereon. For example, the received communication may include sufficient information for the first server computing device 110 to create and execute the server 132. If the received communication fails to include sufficient information to allow the first server computing device 110 instantiate the server 132, the first server computing device 110 can transmit a third communication to the first client computing device 104 via the proxy server 115 in the manner describe above, wherein the third communication comprises the AID and an indication that the server 132 is desirably instantiated. In an example, the indication can be an error message. Responsive to receiving such error message, the first client 120 can transmit a fourth communication to the first server computing device 110 by way of the proxy server 115, wherein the fourth communication comprises sufficient information to allow the first server computing device 110 to instantiate the server 132.

Figure 2:
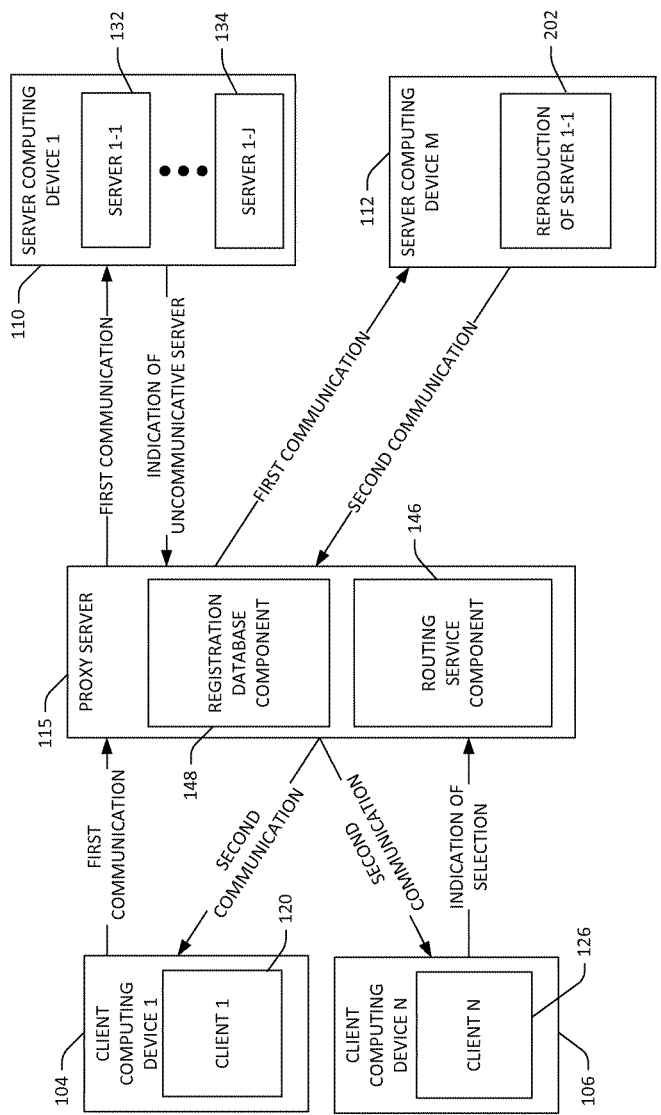

Referring now to FIG. 2, an exemplary system 200 that facilitates executing a distributed application through utilization of a RESTlike API is illustrated. The system 200 includes the first client computing device 104, which transmits a first communication comprising a request for a first resource to the proxy server 115. The routing service component 146 identifies the first server computing device 110 as a server computing device that executes or desirably executes the server 132 that serves the first client 120 being executed by the first client computing device 104. In an exemplary embodiment, the first server computing device 110 may be uncommunicative, and therefore may fail to reply to the request.

The first server computing device 110 can become uncommunicative for various reasons, including scheduled maintenance, a system crash, or connectivity issues. When the first server computing device 110 is uncommunicative, servers being executed by the first server computing device 110 are unavailable to their respective clients. Such unavailability can interfere with the services being offered to the respective clients and negatively impact user experiences with the distributed application. Therefore, as discussed above, the distributed application is configured to adapt to such changes in availability of devices.

To that end, the routing service component 146 can determine that the first server computing device 110 is uncommunicative (e.g., the first server computing device 110 fails to respond to a request or transmits data indicating that it will be uncommunicative). Responsive to determining that the first server computing device 110 is uncommunicative, the routing service component 146 identifies the Mth server computing device 112 as a replacement server computing device. Specifically, the Mth server computing device 112 is identified as having sufficient resources to instantiate a reproduction 202 of the server 132 for serving the first client 120. Responsive to identifying the Mth server computing device 112 as a replacement server computing device, the routing service component 146 can route the first communication to the Mth server computing device 112, which can instantiate the reproduction 202 of the server 132 thereon. The reproduction 202 of the server 132 can thereafter generate a response to the request for the first resource, and transmit the response as a portion of a second communication to the proxy server 115.

It can be noted that the request for the first resource generated by the first client 120 may be non-specific to any one server or server computing device. For example, the first client 120 can generate a request for a "contacts" resource without knowing what server or server computing device will be used to service the request. Further, a different server, such as the reproduction 202 of the server 132 can retrieve information to maintain the first resource and service the request from the first client 120, even though the first resource was previously maintained by a different server/server computing device. Thus, when the first communication comprising the request for the first resource is routed to the Mth server computing device 112, the reproduction 202 of the server 132 can retrieve sufficient information to compose the first resource that had been previously maintained by the uncommunicative first server computing device 110 and transmit the reply to the request in the first communication based upon the first resource.

Because different servers can be used to reply to requests for non-specific resources, the first server computing device 110 becoming unavailable need not impact the first client 120 (and thus the user experience). For example, the first client 120 may be utilizing the first resource maintained by the server 132. When the first server computing device 110 becomes unavailable, the first client 120 can continue to utilize the first resource, although the resource is now maintained by the reproduction 202 of the server 132 on the Mth server computing device 112. Thus, when the server serving a client changes, the client need not wipe out and/or recover data, and thus may function as if service were not interrupted. For example, the first client 120 can be participating in an instant messaging conversation with another client, and may continue to transmit and receive instant messages when the server 132 is reproduced on the Mth server computing device 112 during the instant messaging conversation.

In other situations, however, the first client 120 may be engaged in a real-time communications session, such as a voice or video conference. In such situations, to avoid interruptions in the voice or video conference, it may be desirable for a media server (not pictured) that is executed on a computing device separate from the pool of server computing devices 108 to provide real-time media. For example, after the proxy server 115 has routed communications between clients desiring to engage in a video conference, the proxy server 115 can establish a communications channel between the clients via the media server, such that if a server serving one of the clients becomes unavailable, the video media being served to the clients need not be interrupted.

In addition to adapting to when a device becomes unavailable, the distributed application is configured to adapt to when an additional computing device becomes available. As executing each server on a server computing device utilizes memory and processing resources, a single server computing device can execute a limited number of servers. To increase scale, an additional server computing device can be added to the pool of server computing device 108. Further, memory and processing resources utilization can be monitored on a server computing device, and servers can be redistributed amongst the pool of server computing devices in order to facilitate load balancing.

For example, the proxy server 115 can determine that a load of the first server computing device 110 is above a predetermined threshold, or that the load is high relative to, for example, the Mth server computing device 112. For instance, the Mth server computing device 112 may have been added to the pool of server computing devices 108 in order to increase a number of clients that can be concurrently served. The proxy server 115 can make such determination based on contents of the registration database, which can be indicative of a respective load for each server computing device. In another example, the proxy server 115 can make such determination based on a communication received from the first server computing device 112 comprising an indication of the load of the first server computing device 112. Responsive to the proxy server 115 making the aforementioned determination, the routing service component 146 can cause the server 132 to be removed from the first server computing device 110 (e.g., by transmitting a communication to the first server computing device 110 that comprises a removal instruction). Further, the routing service component 146 can cause the Mth server computing device 112 to create the reproduction 202 of the server 132, and reroute communications to the Mth server computing device 112.

In addition to adding an additional server computing device, the number of servers that can be executed, and thus the number of clients that can be served, can also be increased by increasing an efficiency of the server computing devices executing the servers. As discussed above, the first server computing device 110 can execute a plurality of servers 132-134. However, as a particular client may be used infrequently, it may be desirable to de-allocate memory and processing resources from servers that are idle and allocate the memory and processing resources to servers actively communicating with a client. This allocation and de-allocation can also be referred to as hydration and de-hydration, respectively. In an example, the first server computing device 110 can determine that the server 134 has not received a communication within a threshold amount of time. Responsive to making such determination, the first server computing device 110 can de-hydrate the server 134 by de-allocating memory and processing resources allocated for the server 134. De-hydration can also comprise removing a resource that can be reproduced during hydration. The memory and processing resources allocated to the server 134 can then be available to other servers (e.g., the server 132) executed by the first server computing device 110.

When the first server computing device 110 receives a communication directed to a de-hydrated server (e.g., the server 134), the first server computing device 100 can hydrate the server 134. In some instances, the first server computing device 110 can hydrate the server 134 when a communication intended for the server 134 comprises a specific type of request or a request for a specific resource. When the communication intended for the server 134 fails to comprise such a request, the first server computing device 110 can use another server to serve the request or transmit a reply to the first client 120 indicating that the server 134 is de-hydrated. The first client 120 can transmit a communication that causes the server 134 to be hydrated responsive to receiving such reply.

Servers executing on the server computing devices can also be configured to determine that resources being maintained by such servers have been updated. For example, the server 132 can determine that a resource being maintained thereby has been updated. Such an update can be, for example, that a contact of the user of the client computing device 104 is available, that information available through the resource has been updated, such as a new news feed item being available, or that a user of another client computing device (not pictured) has initiated a call to the user.

When the resource is updated, it may be desirable to deliver the update to the first client 120. The first client 120, however, may be inactive, executing as a background operation, unprepared for the update, etc. In another example, the update may not be time sensitive. Thus, the server 132 is configured to leverage an eventing framework to deliver resource updates to the first client 120.

When the server 132 determines that an event, such as an update, has occurred, the server 132 can utilize an event resource to maintain a list of such events, wherein events can be aggregated in the event resource. The first client 120 is configured to maintain a persistent request for the event resource, for example, by periodically transmitting a communication comprising a hanging request for the event resource. A hanging request is a request to which the server 132 can delay replying until the server 132 deems it appropriate to reply or when the hanging request expires. By maintaining the hanging request, the first client 120 can remain in communication with the server 132 even when the client is executing as a background operation on the first client computing device 104.

When the server 132 determines that it is desirable to reply to the hanging request, the server 132 can generate a reply that indicates resource updates that are available to the first client 120. The first client 120 may then request at least one resource update. Additionally, the server 132 can include a resource update in the reply if the update is real-time sensitive. If, for example, the first client 120 unable to maintain a persistent request (e.g., if the first client 120 is inactive), the server 132 can use a push notification channel to deliver the reply and/or the update. If the server 132 determines that the persistent request is not maintained because, for example, the first client computing device 104 is not in use by the user, the server 132 can continue to aggregate events in the event resource, or can cause the server 132 to be de-hydrated. It can be understood, however, that events may still occur when the first client computing device 104 is not in use. For example, a call can be directed towards the user when the telephone of the user is turned off, and it may be desirable to inform the user that an event, such as a missed call, occurred when the mobile phone was not in use. Therefore, the first server computing device 110 can be further configured to maintain the eventing framework for the server 132 while the server 132 is de-hydrated. Thus, by leveraging the eventing framework in conjunction with hydration and de-hydration of servers, the distributed application can increase efficiency of the servers while maintaining services for a relatively large number of clients.

In still yet another exemplary embodiment, the user may be using additional computing devices that are capable of answering the call. For example, the first client computing device 104 may be the mobile telephone, and the Nth client computing device 106 may be a tablet that is used by the user and is capable of answering the call. If both devices are active, it may be desirable to route the call to both devices, such that the user can select which device to use to answer the call, and if one of the devices is inactive, it may be desirable to route the call to other devices such that the user has the ability to answer the call.

In connection with the foregoing, when the server 132 determines that a second user has initiated a call (with the user as an intended recipient), the server 132 can transmit a second communication (e.g., as a reply to a hanging request of the first client 120) to the proxy server 132, the second communication comprising an AID for the first client 120 and an indication that an incoming call has been received for the first client 120. The routing service component 146 receives the second communication and identifies the first client computing device 104 by comparing the AID in the second communication with contents of the registration database. Further, the routing service component 146 can be configured to identify other client computing devices of the user by comparing the AID with content of the registration database. Specifically, when the routing service component 146 receives a communication from a client computing device, it causes the registration database component to update the registration database with an entry including an AID for the client computing device. Thus, the registration database can comprise an entry with an AID for each client computing device of the user, including the first client computing device 104 and the Nth client computing device 106. Therefore, both the first client computing device 104 and the Nth client computing device 106 can be identified by the routing service component 146. The proxy server 115 can thus cause the second communication to be routed to both devices.

Entries in the registration database can be configured to persist for a predetermined period of time, such as, for example, an hour, a day, a week, fifteen days, etc., and then automatically expire so that communications are only routed to devices that were recently known to be active and/or available. The user may then select, for example, to answer the call using the Nth client computing device 106, whereby the Nth client 126 transmits data to the server 132 (via the proxy server 115) that indicates that the Nth client computing device has been selected. The proxy server 115 can be configured to route subsequent communications from the server 132 (and/or from another client) to the Nth client computing device 106.

FIGS. 3-10 illustrate exemplary methodologies relating to enhancing resiliency and scalability of a distributed application through use of a RESTlike API. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

FIGS. 3-6 illustrate exemplary methodologies pertaining to executing a proxy server on a proxy server computing device. The proxy server supports routing of communications between client computing devices in a pool of client computing devices and server computing devices in a pool of server computing devices, and leverages an API that generally conforms to a REST architecture to facilitate the routing.

Figure 3:
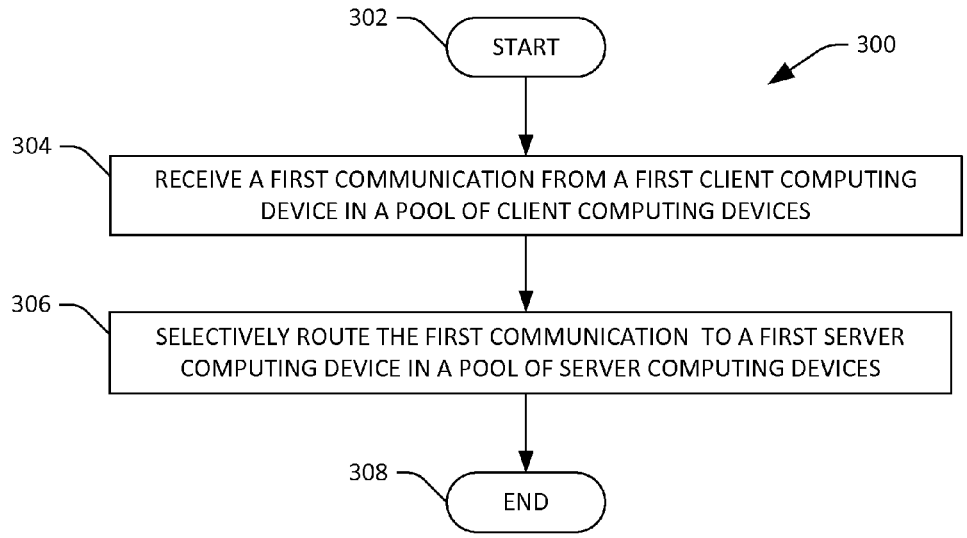
FIGS. 3-6 are flow diagrams that respectively illustrate exemplary methodologies for executing a proxy server at a proxy server computing device.

Referring solely to FIG. 3, an exemplary methodology 300 that can be executed by a proxy server computing device is illustrated. The methodology 300 starts at 302, and at 304, the proxy server receives a first communication from a first client computing device in the pool of client computing devices. The communication can comprise, for example, a request for a resource, and can also comprise an application instance identifier (AID) that identifies the first client computing device and a user of the first client computing device. At 306, the proxy server selectively routes the first communication to a first server computing device in a pool of server computing devices. The routing may be based on one or more factors, such as a load condition of server computing devices in the pool of server computing devices, an identification of a server computing device in a registration database, etc. The methodology 300 completes at 308.

Figure 4:
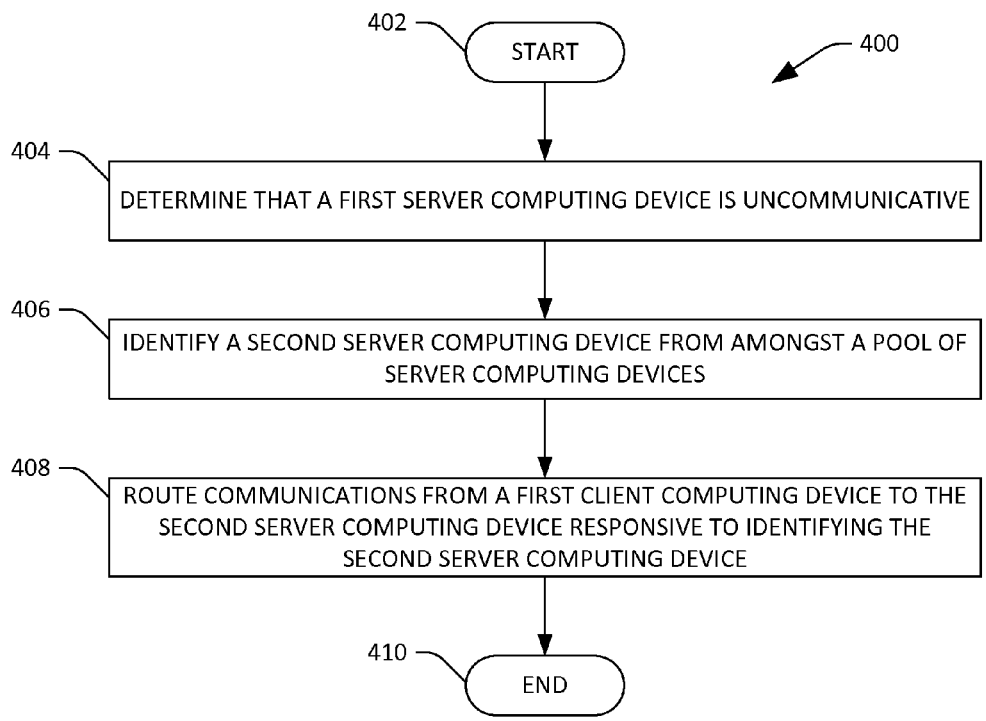

Referring now to FIG. 4, another exemplary methodology 400 that can be executed by a proxy server computing device is illustrated. The methodology 400 starts at 402, and at 404 a determination is made that a first server computing device is uncommunicative. The determination can be based on, for example, a lack of a reply from the first server computing device, a communication from the first server computing device indicating that it is entering an uncommunicative state (e.g., is undergoing scheduled maintenance), etc. At 406, a second server computing device is identified from amongst the pool of server computing devices. The second server can be identified based on, for example, a load condition of the second server computing device. At 408, the proxy server routes communications from a first client computing device to the second server computing device responsive to identifying the second server computing device. The methodology 400 completes at 410.

Figure 5:
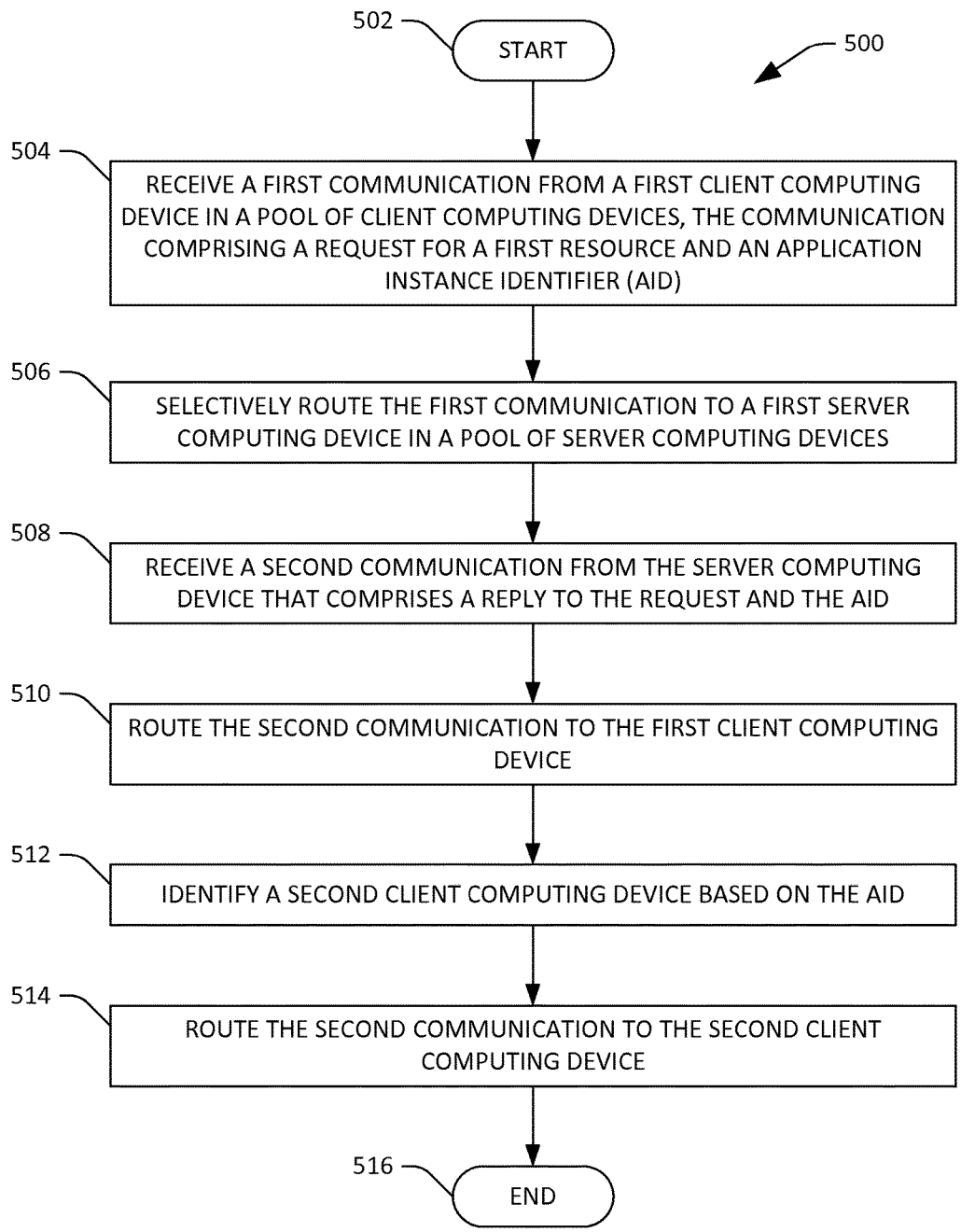

Referring now to FIG. 5, another exemplary methodology 500 that can be executed by the proxy server device is illustrated. The methodology 500 starts at 502, and at 504, a first communication from a first client computing device in a pool of client computing devices is received. The first communication comprises a request for a first resource and an application instance identifier (AID) that identifies, for example, the first client computing device and a user of the first client computing device. At 506, the first communication is selectively routed to a first server computing device in a pool of server computing devices. At 508, a second communication from the server computing device is received, wherein the second communication comprises a reply to the request received at 504. Additionally, the second communication can include the AID. At 510, the second communication is routed to the first client computing device.

The routing can be based on, for example, using the AID from the second communication to identify the first client computing device in a registration database.

At 512, a second client computing device of the user is identified based on the AID. For example, the user of the first client computing device may also be the user of the second client computing device, and the proxy server can identify the second client computing device using the identification of the user in the AID in the second communication. At 514, the proxy server routes the second communication to the second client computing device (and optionally to the first client computing device). The methodology 500 completes at 516.

Figure 6:
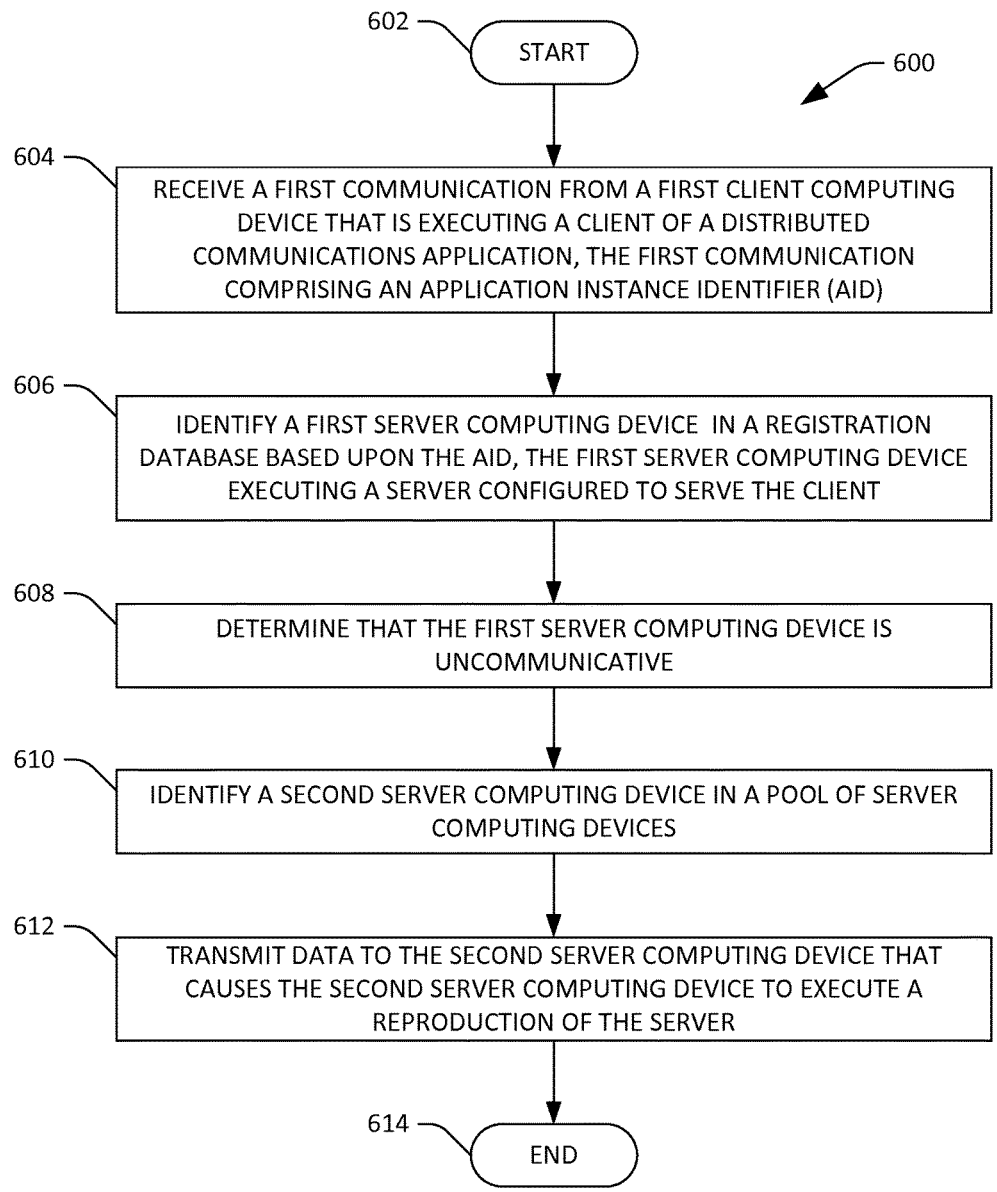

Referring now to FIG. 6, another exemplary methodology 600 that can be executed by a proxy server computing device is illustrated. The methodology 600 starts at 602, and at 604, a first communication is received from a first client computing device in a pool of client computing devices. The first client computing can execute a first client, and the first communication can include an AID that identifies the first client computing device and a user of the first client computing device. At 606, a first server computing device in a registration database is identified based upon the AID. For instance, the first server computing device can be registered in the registration database as executing a first server configured to serve the first client.

At 608, a determination is made that the first server computing device is uncommunicative. At 610, a second server computing device from amongst the pool of server computing devices is identified, and at 612 the data is transmitted to the second server computing device that causes the second server computing device to execute a reproduction of the first server. In an example, a message can be transmitted to the second server computing device that comprises a request to reproduce the first server. In another example, a message can be transmitted to the first client computing device that comprises an indication that the first server is desirably reproduced. The first client can thereafter transmit a message to the proxy server computing device that comprises data usable to reproduce the first server, which the proxy server computing device then routes to the second server computing device. The methodology 600 ends at 614.

Figure 7:
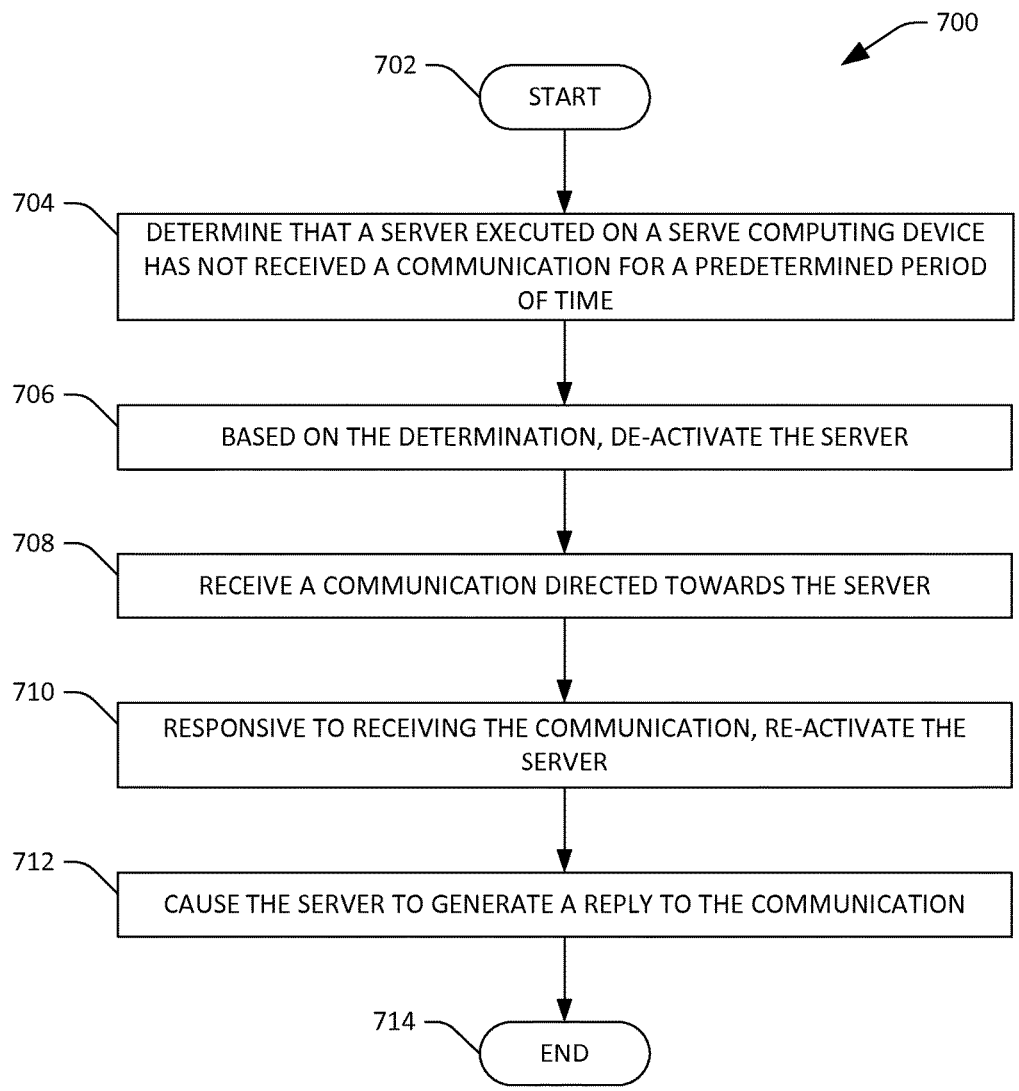
FIGS. 7-9 are flow diagrams that respectively illustrate exemplary methodologies for executing a server-side instance of a distributed application on a server computing device.
Figure 8:
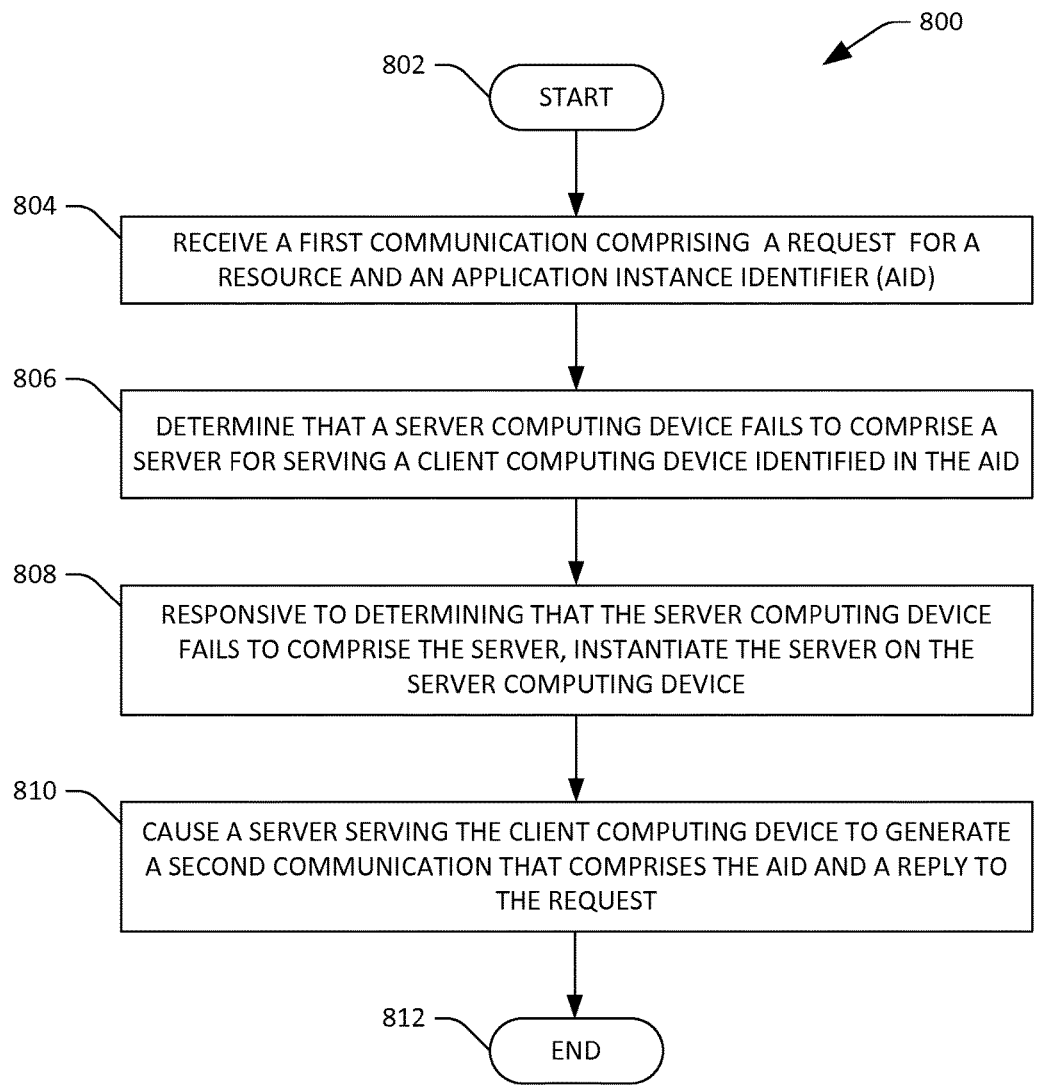

FIGS. 7-8 illustrate exemplary methodologies that can be executed in a server computing device from amongst a pool of server computing devices used in connection with a distributed communications application. The server computing devices can include respective servers that leverage an API that generally conforms to a REST architecture to facilitate serving clients of the distributed communications application.

Referring now solely to FIG. 7, an exemplary methodology 700 that is executed at a server computing device is illustrated. The methodology starts at 702, and at 704, a determination is made that a server executing on the server computing device has not received a communication from a client served by the server for a threshold amount of time (e.g., the client is inactive). At 706, based on the determination, the server is de-activated. De-activation can comprise, for example, at least one of de-allocation of memory or processing resources, removal of resources, etc. At 708, a communication directed to the server from the client is received. The communication can comprise, for example, a request for a resource that supports a mode of communications supported by the distributed communications application.

At 710, responsive to receiving the communication, the server is re-activated, and at 712 a reply to the communication is generated by the server (and subsequently transmitted to the client by way of a proxy server). The methodology 700 completes at 714.

Referring now to FIG. 8, another exemplary methodology 800 that can be executed by a server computing device is illustrated. The method starts at 802, and at 802, a first communication is received, wherein the first communication comprises an AID and a request for a resource. Optionally, at 806, a determination can be made that the server computing device fails to comprise a server that is configured to serve a computing device identified in the AID. At 808, responsive to making the determination, a server on the server computing device is instantiated. Instantiating the server may comprise, for example, transmitting a first message comprising an indication that the server is desirably created to the client computing device via a proxy server, and receiving a second message comprising information to be used for creating the server. At 810, the server is caused to generate a second communication that comprises a reply to the request. The second communication can also include the AID. The server computing device transmits the communication to a proxy server, which can then route the second communication to the client computing device served by the server. The methodology 800 completes at 812.

Figure 9:
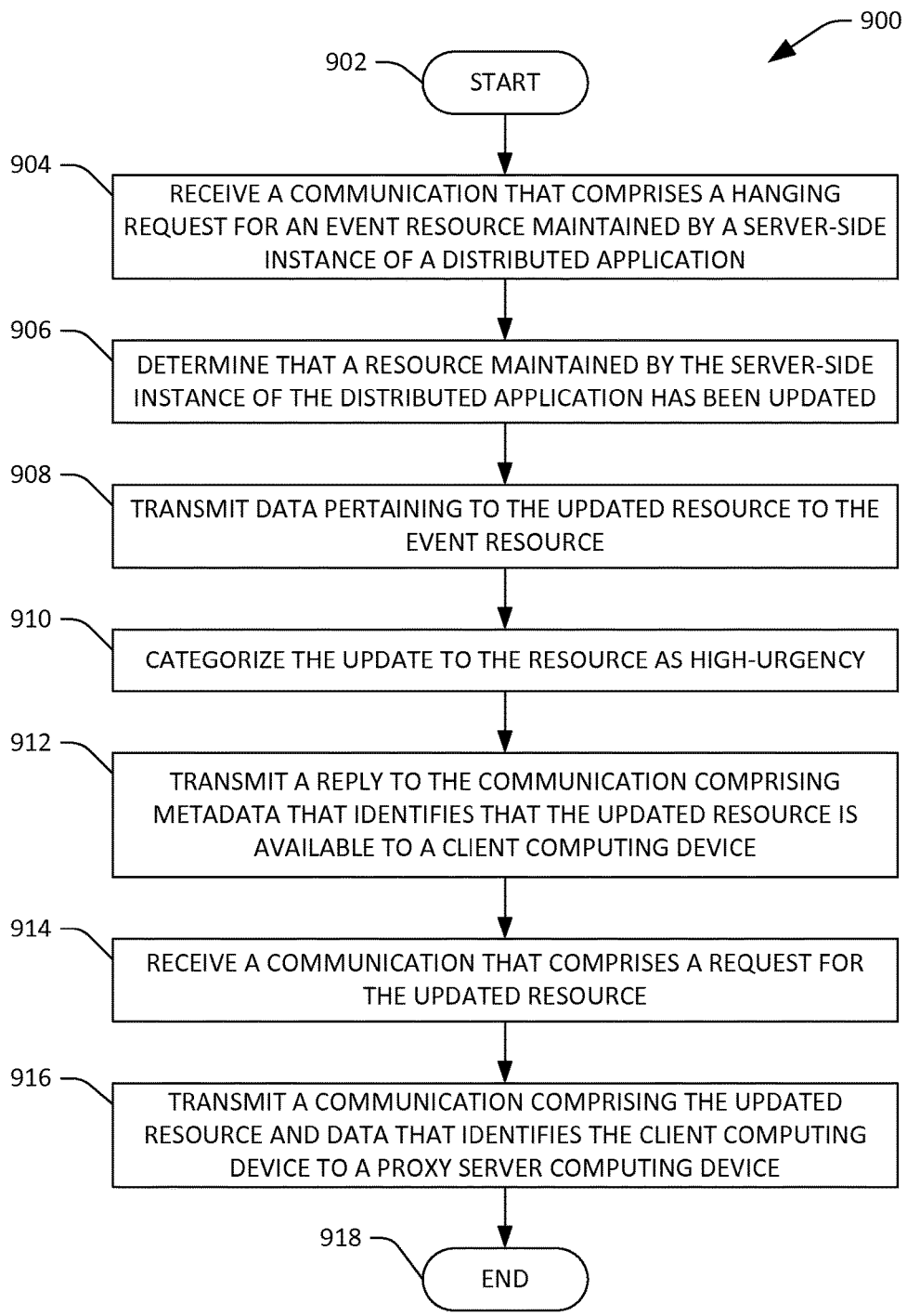

Referring now to FIG. 9, another exemplary methodology 900 that can be executed on a server computing device is illustrated. The methodology 900 starts at 902, and at 904 a communication is received that comprises a hanging request for an events resource maintained by a server executed by the server computing device. At 906, a determination is made that a resource maintained by the server has been updated. At 908, data pertaining to the update is transmitted to the events resource. The data can comprise at least one of the update, metadata identifying a type of the update, an urgency of the update, and/or other information. At 910, the update as categorized as high-urgency, wherein a high urgency updates is an updates that a client computing device being served by the server is to be informed of immediately. At 912, a reply to the communication is transmitted to the client computing device, the reply comprising metadata that identifies the updated resource as available to the client computing device. In an example, the reply is transmitted to the client computing device via a proxy server. In another example, the reply is transmitted to the client computing device via a communications channel between the server computing device and the client computing device. At 914, a communication is received that comprises a request for the updated resource, and at 916 a communication comprising the updated resource and information identifying the client computing device is transmitted to the proxy server, which routes the communication to the client computing device. The methodology 900 completes at 918.

Figure 10:
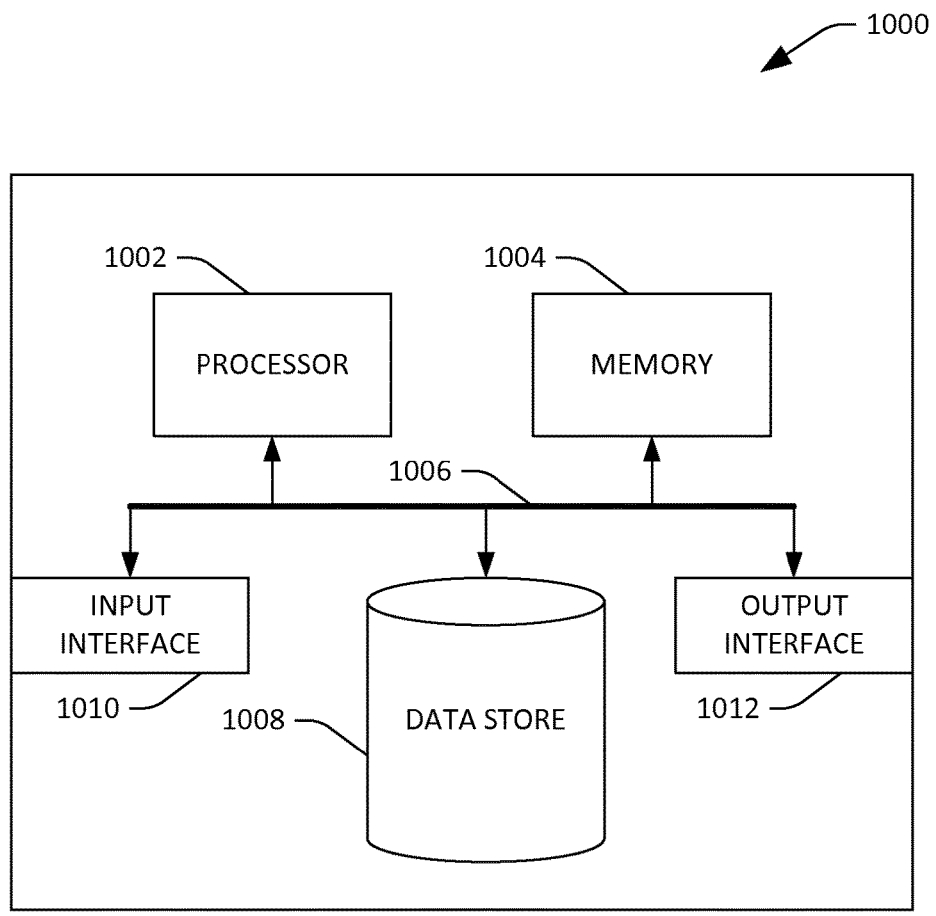
FIG. 10 is an exemplary computing system.

Referring now to FIG. 10, a high-level illustration of an exemplary computing device 1000 that can be used in accordance with the systems and methodologies disclosed herein is illustrated. For instance, the computing device 1000 may be used in a system that facilitates execution of software for a distributed application that uses a RESTlike API in connection with transmitting data between computing devices. The computing device 1000 includes at least one processor 1002 that executes instructions that are stored in a memory 1004. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store a registration database, resources, etc.

The computing device 1000 additionally includes a data store 1008 that is accessible by the processor 1002 by way of the system bus 1006. The data store 1008 may include executable instructions, resources, a registration database, etc. The computing device 1000 also includes an input interface 1010 that allows external devices to communicate with the computing device 1000. For instance, the input interface 1010 may be used to receive instructions from an external computer device, from a user, etc. The computing device 1000 also includes an output interface 1012 that interfaces the computing device 1000 with one or more external devices. For example, the computing device 1000 may display text, images, etc. by way of the output interface 1012.

It is contemplated that the external devices that communicate with the computing device 1000 via the input interface 1010 and the output interface 1012 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1000 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1000 may be a distributed system. Thus, for instance, several devices may be in communication by way of a network connection and may collectively perform tasks described as being performed by the computing device 1000.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. The processor module and/or a combination of the processor module and associated memory described herein is intended to encompass any of such hardware logic components.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A computing device comprising:
    a processor module; and
    memory that comprises a proxy server for a unified communications (UC) application, wherein the proxy server, when executed by the processor module, is configured to perform acts comprising:
        during a communication session, and responsive to receiving a request for a resource from a UC client executing on a client computing device that is in network communication with the computing device, identifying a UC server executing on a server computing device that is in network communication with the computing device, the request for the resource from the UC client comprises an application instance identifier (AID) for the client computing device and complies with a representational state transfer (REST) architecture, the AID based on an identity of the client computing device and an identity of a user of the client computing device, and further wherein the UC server is identified based upon the UC server previously servicing the UC client during the communication session, the AID in the request for the resource, and the AID being included in an entry in a registration database;
        responsive to identifying the UC server, transmitting a second request for the resource to the UC server;
        subsequent to transmitting the second request, determining that the UC server is noncommunicative; and responsive to determining that the UC server is noncommunicative, transmitting a third request for the resource to a second server computing device that is in network communication with the computing device, wherein the second server computing device, responsive to receiving the third request, instantiates a second UC server, and further wherein the second UC server is configured to service the UC client during the communication session.

2. The computing device of claim 1, wherein the client computing device is a mobile telephone.

3. The computing device of claim 1, the acts further comprising:
maintaining the registration database that comprises an entry.

4. The computing device of claim 1, the acts further comprising:
causing the server computing device to instantiate the UC server on the server computing device responsive to receiving a previous communication from the client computing device; and
updating the registration database to cause the entry to be included therein responsive to causing the server computing device to instantiate the UC server on the server computing device.

5. The computing device of claim 4, the acts further comprising:
identifying the second server computing device from amongst a pool of server computing devices responsive to determining that the UC server is noncommunicative.

6. The computing device of claim 5, wherein the second UC server is a reproduction of the UC server.

7. The computing device of claim 1, wherein the entry expires after a threshold amount of time has passed from a most recent communication being received from the client computing device.

8. The computing device of claim 1, wherein the registration database further comprises a second entry that comprises a second AID for a second client computing device of the user, the acts further comprising:
receiving a request for a second resource from the client computing device, the request for the second resource comprises the AID for the client computing device; and
transmitting the second resource to both the client computing device and the second client computing device based upon the AID and the second AID in the registration database.

9. The computing device of claim 8, the acts further comprising:
receiving an indication from the second client computing device that a second UC client executing on the second client computing device has received the second resource; and
causing subsequent communications that comprise the AID to be routed to the second client computing device.

10. The computing device of claim 1, wherein the second UC server is de-activated due to inactivity of the client, the acts further comprising routing a request for a second resource from the client computing device to the second server computing device that causes the second server computing device to re-activate the second UC server.

11. The computing device of claim 1, the acts further comprising:
receiving a reply to the third request, the reply comprising at least one of the resource, a data packet generated based on the resource, or an update to the resource; and
transmitting the reply to the client computing device based on the AID in the request for the resource and the AID in the registration database.

12. A method performed by a server computing device that executes a proxy server of a unified communications (UC) application, the method comprising:
receiving, at the proxy server and during a communication session between a UC client executing on a computing device and a UC server executing on a server computing device, a request for a resource from the client computing device, the request for the resource comprises an application instance identifier (AID) for the client computing device and complies with a representational state transfer (REST) architecture, the AID based on an identity of the client computing device and an identity of a user of the client computing device, wherein the AID is included in an entry in a registration database;
responsive to receiving the request, transmitting a second request for the resource to the server computing device;
subsequent to transmitting the second request to the server computing device, determining that the UC server is uncommunicative; and
responsive to determining that the UC server is uncommunicative, transmitting a third request for the resource to a second server computing device, wherein the second server computing device, responsive to receiving the third request, instantiates a second UC server, and further wherein the second UC server is configured to service the UC client during the communication session.

13. The method of claim 12, wherein the second request is transmitted to the server computing device based upon the AID.

14. The method of claim 13, further comprising:
identifying the second server computing device from amongst a pool of server computing devices responsive to determining that the UC server is uncommunicative; and
transmitting the third request to the second server computing device responsive to identifying the second server computing device.

15. The method of claim 13, further comprising:
receiving a reply to the third request from the second server computing device, the reply comprising at least one of the resource, a data packet generated based on the resource, or an update to the resource; and
transmitting the reply to the client computing device based upon the AID.

16. The method of claim 15, wherein the reply comprises the AID, the method further comprising:
identifying a second client computing device based on the AID in the received reply; and
transmitting the reply to both the first client computing device and the second client computing device responsive to identifying the second client computing device.

17. A computer readable storage medium comprising instructions that, when executed by a processor, cause the processor to perform acts comprising:
executing a proxy server in a distributed unified communications (UC) application, the proxy server supporting routing of communications between client computing devices in a pool of client computing devices and server computing devices in a pool of server computing devices, wherein executing the proxy server comprises:
during a communication session between a UC client executing on a client computing device in the pool of client computing devices and a UC server executing on a server computing device in the pool of server computing devices, receiving a request for a resource from the client computing device, the request for the resource comprises an application instance identifier (AID) for the client computing device and complies with a representational state transfer (REST) architecture, the AID based on an identity of the client computing device and an identity of a user of the client computing device, wherein the AID is included in an entry in a registration database;

determining that the server computing device is uncommunicative;

responsive to determining that the server computing device is uncommunicative, identifying a second server computing device in the pool of server computing devices;

transmitting data to the second server computing device that causes the second server computing device to instantiate second UC server, the second UC server being a reproduction of the UC server; and continuing the communication session, wherein the communication session, when continued, is between the UC client executing on the client computing device and the second UC server executing on the second server computing device.

18. The computer readable storage medium of claim 17, the acts further comprising:

responsive to receiving the request for the resource from the client computing device, transmitting a second request for the resource to the server computing device based upon the AID in the request for the resource; and determining that the server computing device is uncommunicative subsequent to transmitting the second request to the server computing device.

19. The computer readable storage medium of claim 18, the acts further comprising:

responsive to determining that the server computing device is uncommunicative, updating a registration database such that the AID is mapped to the second server computing device that executes the second UC server.

20. The computer readable storage medium of claim 19, wherein the AID is mapped to the client computing device and a second client computing device in the registration database, the acts further comprising:

receiving a communication from the second server computing device during the communication session, the communication comprises the AID; and transmitting the communication to both the client computing device and the second client computing device based upon the AID being mapped to both the client computing device and the second client computing device in the registration database.

* * * * *